US005602192A

United States Patent [19]

Yoshida et al.

[11] Patent Number: 5,602,192
[45] Date of Patent: Feb. 11, 1997

[54] PROCESS FOR PRODUCING SAND MOLD

[75] Inventors: Akira Yoshida; Naoki Kyochika; Tsutomu Tanaka; Katsumi Matsuyama; Kazuhiko Kiuchi, all of Aichi, Japan

[73] Assignee: Kao Corporation, Tokyo, Japan

[21] Appl. No.: 154,726

[22] Filed: Nov. 19, 1993

Related U.S. Application Data

[63] Continuation of Ser. No. 719,632, Jun. 24, 1991, abandoned.

[30] Foreign Application Priority Data

| Jul. 5, 1990 | [JP] | Japan | 2-178634 |
| Aug. 31, 1990 | [JP] | Japan | 2-229718 |
| Dec. 27, 1990 | [JP] | Japan | 2-408225 |

[51] Int. Cl.$^6$ ............................ B22C 1/12; B22C 1/18
[52] U.S. Cl. ........................... 523/145; 523/146; 524/430; 524/431; 524/432; 524/433; 524/436; 524/596; 164/6
[58] Field of Search ................... 523/145, 146; 524/596, 430, 431, 432, 433, 436; 164/6

[56] References Cited

U.S. PATENT DOCUMENTS

| Re. 32,720 | 7/1988 | Lemon et al. | 523/145 |
| Re. 32,812 | 12/1988 | Lemon et al. | 523/145 |
| 3,725,333 | 4/1973 | Adkins et al. | 523/144 |
| 4,215,012 | 7/1980 | Kho et al. | 252/429 R |
| 4,273,910 | 6/1981 | Lederer | 528/48 |
| 4,311,619 | 1/1982 | Seeney et al. | 260/7 |
| 4,460,629 | 7/1984 | Haraga et al. | 427/221 |
| 4,468,359 | 8/1984 | Lemon et al. | 264/82 |
| 4,474,904 | 10/1984 | Lemon et al. | 523/146 |
| 4,543,373 | 9/1985 | Krawiec et al. | 523/144 |
| 5,043,412 | 8/1991 | Chandramouli et al. | 528/129 |
| 5,082,876 | 1/1992 | Iyer et al. | 523/145 |
| 5,214,111 | 5/1993 | Gerber | 525/506 |
| 5,223,554 | 6/1993 | Gerber | 523/139 |
| 5,294,649 | 3/1994 | Gerber | 523/145 |

FOREIGN PATENT DOCUMENTS

| 0202004 | 11/1986 | European Pat. Off. |
| 0336534 | 10/1989 | European Pat. Off. |
| 0336533 | 10/1989 | European Pat. Off. |
| 0376432 | 7/1990 | European Pat. Off. |
| 0388145 | 9/1990 | European Pat. Off. |
| 0465919 | 1/1992 | European Pat. Off. |
| 1769344 | 3/1971 | Germany |
| 50-130627 | 10/1975 | Japan |
| 58-154433 | 9/1983 | Japan |
| 58-154434 | 9/1983 | Japan |
| 1262042 | 10/1989 | Japan |
| 1262043 | 10/1989 | Japan |
| 2017126 | 10/1979 | United Kingdom |
| 2115825 | 9/1983 | United Kingdom |

OTHER PUBLICATIONS

English translation of Japanese Patent Laid–Open No. 130627/1975, Oct. 16, 1975.
Patent Abstracts of Japan, vol. 10, No. 227 (M–505) (2283) Aug. 7, 1986 & JP–A–61 063 335 (Rigunaito KK) Apr. 1, 1986.
Patent Abstract of Japan, vol. 9, No. 55 (M–362) (1778) Mar. 9, 1985 & JP–A–59 189 030 (Mazda KK) Oct. 26, 1984.
Database WPIL, Week 8910, Derwent Publications Ltd., London, GB AN 89–071558 & JP–A–1 022 446 (Hodogaya Ashland) Jan. 28, 1989.
Foundry Trade Journal, "Modern Sand Binders—A Review", Dec. 1989, pp. 922–926, vol. 163.
Ullmann's Encyclopedia of Industrial Chemistry, vol. A12, 5th Ed., pp. 37–39 (1989).

*Primary Examiner*—Paul R. Michl
*Assistant Examiner*—John J. Guarriello

[57] ABSTRACT

A foundry mold is produced from sand by blending, with one another, sand, a binder comprising a ester cured-phenolic resin, a curing agent comprising an organic ester compound and one or more additives containing therein a metal of the groups IB to VIII, and molding and curing the mixture into a foundry mold. The mixture is useful in a self-curing molding method and a vapour curing molding method, and the resulting mold is thereby provided with an unexpected improved mechanical strength. In particular the invention is advantageously effective with used or reclaimed refractory sand.

28 Claims, No Drawings

PROCESS FOR PRODUCING SAND MOLD

This application is a continuation of application Ser. No. 07/719,632 filed on Jun. 24, 1991, now abandoned.

TECHNICAL FIELD OF INVENTION

The invention relates to a process for producing a sand casting mold with an additive. This invention applies to a self-curing molding method and a vapor curing molding method. In the specification, the word "hardening" is used for curing.

More particularly, the present invention relates to an improved process for making a sand casting mold, which is used in a process wherein a water-soluble phenolic resin is used as a binder which is hardened with an organic ester.

PRIOR ART

Self-hardening molding, cold box molding and the Croning process (shell process) are known as a molding processes for making molds, such as main molds and cores, by using an organic binder. In particular, organic self-hardening molding processes have already become generally used molding processes instead of inorganic processes, from the viewpoint of productivity, the quality of castings, and safety and hygiene, mainly in the field of machine castings.

Meanwhile, the Croning process (wherein a granular refractory material coated with a phenolic resin, i.e., a coated sand, is heat-hardened to make a mold) has hitherto been used for making a mold at a medium or high speed.

However, in order to achieve energy saving in molding and improve the molding rate and qualities of molds and castings, the cold box molding process (wherein hardening is conducted at room temperature with a gaseous or aerosol substance) has earnestly been attempted as a molding process which substitutes for the Croning process in the casting industry.

Binder compositions used in the organic self-hardening molding process and gas-hardening molding process include a binder composition for molding sand comprising a water-soluble phenolic resin as a binder and an organic ester as a hardening agent for the binder as disclosed in Japanese Patent Laid-Open Nos. 130627/1975, 154433/1983 and 154434/1983.

The molding process wherein the above-described binder used is less susceptible to sulfurization than the molding process wherein an acid hardening resin is used, because the binder is free from a sulfur atom. In this process, however, since the strength of the mold is low, the amount of the resin necessary for the molding is very large. This causes a large amount of gas to be generated during pouring, so that gas defects tend to occur. Further, it has the drawback of poor profitability and the drawback that the mold strength decreases when an increasing amount of recovered sand, intended for reuse after casting, is used and when the reclaimed sand has been used a plurality of times, so that an improvement in this process has been desired in the art.

In order to improve the strength of a mold prepared by using the above-described binder, it is a common practice to use a binder that also contains a silane coupling agent, and the effect of the combined use is recognized. Since, however, the effect is lower than that of the acid hardening resin, a further improvement has been desired.

Moreover a foundry mold made from used refractory sand gets weaker in mechanical strength than a mold made from new sand. The more frequently it is used, the weaker the mold gets. JP-A 1-262 042 discloses that a mold of used sand can be strengthened with addition of a resin having a low solid content. JP-A 1-262 043 discloses that used sand is treated with a silane solution. These proposals still do not satisfy the demand of a person skilled in the art.

SUMMARY OF THE INVENTION

The invention is characterized by the use of a special additive(s) and therefore provides a resulting mold with an unexpectedly improved mechanical strength. In particular the invention is advantageously effective with used or reclaimed refractory sand.

The word casting is used hereinafter to mean foundry.

The invention provides a process for producing a foundry mold from sand, which comprises the steps of blending, with one another, sand, a binder comprising a ester cured-phenolic resin, a curing agent comprising an organic ester compound and one or more additives containing therein a metal of the groups IB to VIII, and molding and curing the mixture into a foundry mold.

The additive may be either a metal of the groups IB to VIII or a compound including the metal. It is preferable that the additive is a metal of the groups II to VIII, more preferably II, III, IV or VIII, or a compound including the metal. The most preferable metals are magnesium, zinc, aluminum, calcium and zirconium.

The metal compound includes (1) a metal-sequestering agent of the metal and (2) a chelating compound of the metal. In way of material it preferably includes (3) an inorganic salt of the metal, (4) an organic salt of the metal, (5) a hydroxide of the metal, (6) a complex compound of the metal and (7) an oxide of the metal.

DETAILED DESCRIPTION OF THE INVENTION

The metals to be used in the invention belong to the periodic groups IB to VIII of the long form of the periodic table. Semi-metals are excluded from the metal of the invention, such as B, Si, As, Sb, Te, Ge and Se. The metals to be used preferably include Cu, Ag, Au in the group IB, Mg, Ca, Sr, Ba, Zn, Cd and Hg in group II, Al, Sc and Ga in group III, Ti, Zr and Sn in group IV, V and Bi in group V, Cr, Mo and W in group VI, Mn and Tc in group VII and Fe, Co and Ni in group VIII.

The metal is preferably in the form of a powder, and alloys thereof may be used here. For example, suitable metals include Zn powder, Ni powder, Fe powder, Mn powder, Cu powder, duralumin, magnalium, which is an alloy of aluminum and magnesium, ferromagnesium, magnesiumsilicon and ferromanganese.

The compound including a metal to be used in the invention, a metal compound, includes salts, complex salts, hydroxides, oxides, metal compounds in which a hydrocarbon group such as an alkyl or an aryl bonds to the metal, nitrides, alkoxides, hydrides, carbonates, metal imides, peroxides, sulfides, phosphates, nitro-compounds, anilides, phenolates, hexa-ammonium products, ferrocenes and their similar compounds, dibenzenechromium compounds and their similar compounds, inorganic heteropolymers, metal carbonyls, metal-containing enzymes, inclusion compounds, metal complexes, chelating compounds and coordinate polymers. Among them, the above shown (1) to (7) are preferable.

The salt, hydroxide and oxides of the metal are preferably defined by the formula: MaXb in which M is the metal, X is oxygen, hydroxyl, an anionic group of an inorganic acid, or an anionic group of an organic acid, and a and b each are an integer of 1 or larger. X includes halogen such as F, Cl and Br, SO4, SO3, S2O6, SiF6, MoO4, MnO4, NO3, NO2, ClO3, ClO, CO3, HCO3, CrO4, IO3, PO3, PO4, HPO3, HPO4, H2PO4, P2O7, H2PO2, SiO3, BO2, BO3, B4O7 and Fe(CN)6. The organic acid includes carboxylic acids such as formic acid, acetic acid, oxalic acid, tartaric acid and benzoic acid, organic sulfonic acids such as sulfamic acid, xylenesulfonic acid, toluenesulfonic acid, phenolsulfonic acid, benzenesulfonic acid and alkylbenzenesulfonic acids and organic phosphoric acids such as methylphosphoric acid and ethylphosphoric acid. The complex salt includes an alum having the formula: $M_2^{3+}(SO_4)_3 M_2^{1+}SO_4 24H_2O$ in which $M^{3+}$ is a trivalent metal such as Al, V, Mn and Fe and $M^{1+}$ is Na or K.

Salts and hydroxides, including a metal belonging to the group II, III, VI, VII and VIII, are preferable. They include calcium chloride, magnesium chloride, barium chloride, copper chloride, zinc chloride, calcium bromide, aluminum fluoride, vanadium chloride, molybdenum chloride, manganese chloride, iron chloride, nickel chloride, calcium sulfide, calcium carbonate, magnesium phosphate, calcium phosphate, calcium formate, MgC2O4.2H2O, calcium toluenesulfonate, aluminum chloride, tin chloride, magnesium acetate, zinc acetate, aluminum sulfate and aluminum acetate.

The complex salt includes potassium alums and ammonium alums. The hydroxide incudes aluminum hydroxide, calcium hydroxide, magnesium hydroxide and zinc hydroxide.

The oxide and its complex compound are preferred to include a metal of the groups II and III, in particular Al, Zn, Ca, Mg and Ba. They are preferred to have a total hardness in the range given below. The oxide includes aluminum oxide, zinc oxide, calcium oxide, magnesium oxide and barium oxide. The complex compound is derived from two or more of these oxides or a combination of an oxide and another oxide or a salt. The complex compound includes the examples given below.

The additive to use in the invention is preferred to have a particle size of not larger than 200 microns on the average, more preferably not larger than 50 microns.

The metal compound in which a group such as an alkyl or an aryl bonds to the metal includes: Grignard reagents, for example shown by the formula: R—Mg—X in which R is an alkyl or an aryl and X is a halogen, trimethylaluminum, triethylaluminum, triphenylaluminum, (C2H5)2AlI, (C2H5)2AlH, (C2H5)2AlCN, Al(i-C4H9)3, (CH2=CH)3Al, Zn(C6H5)2, (CH2=CH)2Zn and Ca(C2H5)2.

The nitride includes Mg3N2, Zn3N2 and AlN. The metal alkoxide includes Al[OCH(CH3)2]3 and Zn (OCH3)2. The hydride includes AlH3, CaH2 and BAH2. The carbonate includes Al4C3 and CaC2. The metal imide includes Ca (NH2)2. The peroxide includes CaO2, BaO2 and BaO4. The sulfide includes ZnS, Cu2S and CuS. The phosphate includes AlP. The nitro compound includes CuNO2. The anilide includes Al(NHPh)3. The phenolate includes Al-phenolate, Zn-phenolate and Ca-phenolate. The hexa-ammonium products includes Ca(NH3)6. The ferrocenes and their similar components include ferrocene (Fe(C5H5)2), Zn(C5H5)2, Ni(C5H5)2, Mn (C5H5)2 and V(C5H5)2. The inorganic heteropolymer includes hydrogenated inorganic metal polymer such as hydrogenated beryllium polymer, hydrogenated magnesium polymer and hydrogenated aluminum polymer; inorganic polymers such as aluminum nitride having Al—N bond; aluminosilicates such as zeolites, analcite and mica; aluminum phosphate and hydrotarcite.

The inclusion compound includes cyclic polyethers (crown ether), cyclic polyamines (aza-crown compound), cyclic polythiaether (thiacrown compound), complex donner crown compound, heterocyclic crown compound (cryptand), polymeric crown compound, cyclic phenol (calix arene), and complexes with cyclodextrin derivatives such as a complex of dibenzo-18-crown-6 and $Ca^{++}$.

The complex compound includes the cements and furnace slags shown below.

In addition they include [Al(C2O4)3]Cl3 and [Zn(NH3)6]Cl2. The complex compound has the coordinate number of 2 to 8, including an anion coordinate such as $Cl^-$, $NCS^-$, $SO_4^{2-}$, $NO_2^-$, $CH_3COO^-$, $C_2O_4^{2-}$, $CO_3^{2-}$, $OH^-$, $H_2NCH_2COO^-$, $F^-$, $Br^-$, $ONO^-$, $I^-$, $NH_2^{31}$, $NO_3^-$, and $SCN^-$ a neutral coordinate such as H2N.CH2.CH2.NH2, C6H5N, NH3 and H2O or a cationic coordinate such as $H_2N-NH_3^+$, $H_2N-CH_2-CH_2-NH_3^+$.

The metal compound includes metal carbonyls such as [Ni(CO)4] and [Mn2(CO)10], metal-containing enzymes such as carboxypeptase A and zircoaluminum.

The additive may be used in process of the invention in the form of either powder or liquid. It may be used in a solution thereof in an alcohol such as methanol and ethanol, a ketone such as acetone and methylethylketone, an ester such as ethyl acetate and butyl propionate, an ether compound such as diethylether and dibutylether and a hydrocarbon such as toluene and xylene. It may also be used in a slurry thereof in the above solvents.

In the self-curing method, the additive is used when refractory powder is added to the manufacturing of a sand mold. The additive can also be added to a binder composition. In the vapor-curing method, it is added to a binder and refractory powder, or it may be added to a binder. The additive is added to refractory powder in both methods.

The metal ion-sequestering agent such as chelate compounds and coordinate polymers are stable and soluble, and therefore can be used effectively by being added to a binder. In this instance, a metal ion-sequestering compound, a metal and a metal-containing compound or a combination of both can be added to the binder in any order of addition.

The use of a metal ion-sequestering compound is useful to remove gelation caused by a large amount of the metal compound and the binder. A mole ratio of a chelate compound to a metal element is preferred to range between 1:0.1 and 1:2.

Regarding ligands for forming the sequestering agent or the chelate compound, representative examples of acetic acid type of amino carboxylic acid ligand include ethylenediaminetetraacetic acid (EDTA) and its salts, nitrilotriacetic acid (NTA) and its salts, trans-1,2-cyclohexanediaminetetraacetic acid (CyDTA) and its salts, diethylenetriaminepentaacetic acid (DTPA) and its salts, triethylenetetraminehexaacetic acid (TTHA) and its salts, glycol ether diaminetetraacetic acid (GEDTA) and its salts, iminodiacetic acid (IDA) and its salts, polyalkylenediaminetetraacetic acid and its salts and, N-hydroxyalkyleneiminodiacetic acid and its salts; representative examples of phenylic amino carboxylic acid ligand include 2-hydroxyphenyliminodiacetic acid and its salts, 2-hydroxybenzyliminodiacetic acid and its salts, benzyliminodiacetic acid and its salts, and N,N'-ethylenebis[2-(o-hydroxyphenyl)]glycine and its salts; representative examples of amino carboxylic acid ligand having a mercaptan group include β-mercaptoethyliminodiacetic acid and its salts; representative examples of amino carboxylic acid ligand having an ether bond include ethyl ether diaminetetraacetic acid and its salts; representative examples of amino carboxylic acid ligand having a thioether bond include ethyl thioether diaminetetraacetic acid and its salts; representative examples of amino carboxylic acid ligand having a sulfonic acid group include β-aminoethylsulfonic acid-N,N-diacetic acid and its salts; representative examples of amino carboxylic acid ligand having a phosphonic acid group include nitrilodiacetic acid-methylenephosphonic acid and its salts; representative examples of amino carboxylic acid ligand having a peptide bond include N,N'diglycylethylenediamine-N',N'',N''',N''''-tetraacetic acid and its salts; representative examples of hydroxycarboxylic acid ligand include gluconic acid and its salts, citric acid and its salts, and tartaric acid and its salts; representative examples of polycarboxylic acid ligand include polyacrylic acid, a copolymer of acrylic acid with maleic acid, and their salts; and representative examples of phosphonic acid ligand include
tripolyphosphoric acid and its salts,
hydroxyethanediphosphonic acid (HEDP) and its salts,
and nitrilotristyrenephosphonic acid (NTP) and its salts.

The coordinate polymer or coordination polymer sequestering a metal ion includes polymers having in the structure an amino group, a nitrogen-containing heterocyclic group, a Schiff base group, a hydroxy group, a carboxy group, a carbonyl group, an ester group, an amide, an aminocarboxy group, phosphonic acid group, phosphine group and/or a thiol group.

In the self-curing method of the invention, per 100 parts by weight of reclaimed sand, it is preferable to use 0.0001 to 10 parts by weight, more preferably from 0.0001 to 3 parts by weight, as the metal content, of the additive, 0.05 to 9, more preferably 0.1 to 5, parts by weight of a curing agent of an organic ester compound, 0.4 to 15, more preferably 0.6 to 5, parts by weight of an aqueous solution of a water-soluble phenol resin.

A silane coupling agent for the binder may be used in an amount of 0.001 to 1 part by weight, preferably 0.002 to 0.5 part by weight, per 100 parts by weight of sand.

In the vapor-curing method, a mixture of 100 parts by weight of sand, 0.0001 to 10 parts by weight, more preferably from 0.0001 to 3 parts by weight, as the metal content, of the additive and 0.4 to 15, more preferably 0.6 to 5, parts by weight of a water-soluble phenol resin is introduced into a mold and a blow of an organic ester in the form of gas or aerosol is led thereinto to cure a mold.

When the additive is added to a water-soluble phenol resin, a curing agent and a binder in advance, it is preferable to use 100 parts by weight of the binder, 0.0005 to 5 parts by weight, more preferably 0.001 to 3 parts by weight, as the metal content, of the additive.

A quantitative determination of metal in sand can be made by the following methods:

Sand is pulverized to have a size of not larger than 150 mesh (Tyler standard) and it is sampled in an amount of 0.2 to 0.3 g on a platinum plate. 5 ml of concentrated HCl, 3 ml of concentrated HF and 10 ml of concentrated HClO4 are added to the sand to vaporize out Si. 10 ml of HCl(1:1) and 10 ml of H2O are added thereto, and the mixture is heated to dissolve the residual salts, which are filtrated out with a filter paper No. 5C, and washed with a diluted hydrochloric acid and warm water. The residue is sintered at 900° C. to 1000° C. in a platinum crucible of 30 ml and is allowed to cool. 2 g of potassiuim pyrosulfate is added thereto and the mixture is acid-melted at 800° C. An extract of the melting product is mixed with the filtrate liquid to prepare 100 ml of a solution. This solution is tested with induced combination plasma emmission analysis (ICP) to determine a quantity of metal.

A quantative determination of metal in the binder can be made by the following methods:

A binder to test is stirred well and it is sampled in an amount of 0.5 to 0.8 g on a platinum plate. 10 ml of concentrated nitric acid is added thereto to decompose the acid products and decomposition is continued by low heating. 10 ml of concentrated HClO4 is added thereto with fuming treatment to obtain 3 ml of HClO4. After being allowed to cool, 10 ml of HCl(1:1) and 10 ml of H2O are added thereto, and heated for dissolution. The resultant is filtrated out with a filter paper No. 5C, and washed with a diluted hydrochloric acid and warm water. The residue on the filter paper is sintered at 900° C. to 1000° C. in a platinum crucible of 30 ml and is allowed to cool. 2 g of potassium pyrosulfate is added thereto and the mixture is acid-melted at 800° C. An extract of the melting product is mixed with the filtrate liquid to prepare 100 ml of a solution. This solution is tested with induced combination plasma emmission analysis (ICP) to determine a quantity of metal.

The water-soluble phenol resin is a resin to cure with an organic ester compound and includes products obtained in alkaline or acidic condition from a phenol such as phenol, cresol, resorcinol, 3,5-xylenol, bisphenol A and substituted phenols and an aldehyde compound such as formaldehyde, acetoaldehyde, furfural aldehyde and a mixture of aldehydes. The alkali substance may be added thereto to get more water-solubility at any step of production procedures, even after the reaction has finished, including sodium hydroxide, potassium hydroxide, lithium hydroxide and mixtures thereof, potassium hydroxide being preferable. The resin may be obtained with a co-monomer such as urea, melamine, and cyclohexanone through formaldehyde condensation.

The organic ester compound includes ester products obtained from lactones or from monohydric or polyhydric alcohols having 1 to 10 carbon atoms, and carboxylic acids having 1 to 10 carbon atoms. In the self-curing method, γ-butyrolactone, propiolactone, ε-caprolactone, ethyl formate, ethyleneglycol diacetate, ethyleneglycol monoacetate and triacetyne are preferred. Methyl formate is preferable in the vapor-curing method.

Refractory powder includes silica, mainly composed of quartz, chromite sand, zircon sand, olivine sand and alumina sand. The powder may be either new or fresh sand or reclaimed sand, including those obtained by an abrading method or a roasting method. The sand reclaimed by abrasion is preferable in view of production yield and cost.

A silane coupling agent may be used to increase a strength of the sand mold, including γ-aminopropyltriethoxysilane, γ-(2-aminoethyl)aminopropyltrimethoxysilane, γ-glycidoxypropyltrimethoxysilane.

The invention provides a resulting mold advantageously with an unexpected improvement in view of mechanical strength.

The invention includes the embodiment (1) relating to metal salts and metal hydroxides.

The additive according to the present invention is a salt or a hydroxide containing a group IB to VIII metallic element. The structure of representative compounds is represented by the following general formula:

MX wherein M is a group IB to VIII metallic element and X is an anionic atomic group of an inorganic acid or an anionic atomic group of an organic acid or a hydroxyl group.

Specific examples of M include Cu as the group IB element; Mg, Ca, Ba and Zn as the group II element; Al as the group III element; Ti, Zr, Si and Sn as the group IV element; V, Ta, Sb and Bi as the group V element; Cr, Mo and W as the group VI element; Mn as the group VII element; and Fe, Co and Ni as the group VIII element. Among them, the group II metallic elements and the groups VI to VIII metallic elements are particularly preferred.

Regarding specific examples of X, the anionic atomic group of an inorganic acid include halogens (F, Cl, Br, etc.), $SO_4$, $SO_3$, $S_2O_3$, $S_2O_6$, $SiF_6$, $MoO_4$, $MnO_4$, $NO_3$, $NO_2$, $ClO_3$, $ClO$, $CO_3$, $HCO_3$, $CrO_4$, $IO_3$, $PO_3$, $PO_4$, $HPO_3$, $HPO_4$, $H_2PO_4$, $P_2O_7$, $H_2PO_2$, $SiO_3$, $BO_2$, $BO_3$, $B_4O_7$, and $Fe(CN)_6$. Examples of the anionic atomic group of the organic acid include those of carboxylic acids, such as formic, acetic, oxalic, tartaric and benzoic acids, and those of organic sulfonic acids, such as sulfamic, xylenesulfonic, toluenesulfonic, phenolsulfonic, benzenesulfonic and alkylbenzenesulfonic acids. Further examples thereof include anionic atomic groups of organic phosphoric acids, such as methylphosphoric acid and ethylphosphoric acid, and OH atomic groups. They may be used in the form of a powder, or a solution or a slurry dispersion in water or other solvents. The use of these additives alone or in a combination of two or more of them serves to exhibit the effect of improving the strength of a reclaimed sand mold.

The invention includes the embodiment (2) relating to metals, metal-sequestering agents and chelating agents.

Representative examples of the metallic element include Cu as the group IB element; Mg, Ca and Zn as the group II element; Al as the group III element; Ti, Zr and Sn as the group IV element; V, Ta, Sb and Bi as the group V element; Cr, Mo and W as the group VI element; Mn as the group VII element; and Fe, Co and Ni as the group VIII element. Among them, the group II metallic elements and the group VIII metallic elements are particularly preferred.

The additive may be prepared by mixing an inorganic salt, an organic salt or a hydroxide containing the above-described group IB to VIII metallic element with a sequestering agent or a chelate compound (hereinafter referred to as the "chelate compound, etc.") in a powder form or together with water or other solvent or in the form of a slurry dispersion. The mixture thus prepared may be used as a binder composition for a sand casting mold. The use of the chelate compound, etc., alone or in a combination of two or more of them contributes to a remarkable improvement in the mold strength of reclaimed sand, etc.

In the most desirable process for making a sand casting mold, it is preferred to directly dissolve the chelate compound, etc. in a water-soluble phenolic resin. More specifically, a sequestering agent or a chelate compound may be added directly or in the form of a solution to a preheated water-soluble phenolic resin, and then an inorganic salt, an organic salt or a hydroxide containing a group IB to VIII metallic element may be dissolved in the mixture, or a chelate compound comprising a group IB to VIII metallic element may be directly dissolved in the mixture.

Further, the molar ratio of the sequestering agent to the group IB to VIII metallic element is preferably 1:(0.1 to 2). When the content of the group IB to VIII metallic element becomes relatively large, the storage stability of the binder is apt to become poor. The same tendency on the storage stability is observed also in the case of the chelate compound comprising a group IB to VIII metallic element.

In general, an inorganic salt, an organic salt or a hydroxide containing a group IB to VIII metallic element may be dissolved in a relatively low concentration in the water-soluble phenolic resin. In order to obtain a sufficient strength in a mold of a reclaimed sand or the like, however, it is necessary to further enhance the concentration of the dissolved salt or hydroxide. However, the enhancement in the concentration of the dissolved salt or hydroxide is apt to bring about gelation, so that the storage stability of the binder is poor. A method of alleviating this problem consists of dissolving a sequestering agent or a chelate compound or both of them in a water-soluble phenolic resin before dissolving an inorganic salt or an organic salt or a hydroxide containing a group IB to VIII metallic element, which makes it possible to attain a dissolution in a concentration capable for providing a sufficient strength of a mold of a reclaimed sand or the like.

The invention includes the embodiment (3) relating to metals of the group IIa, metal oxides and metal complex compounds.

Accordingly, the present invention provides a process for making a sand casting mold by molding a granular refractory material by using a water-soluble phenolic resin as a binder and an organic ester as a hardening agent, characterized in that an oxide containing a group IIa metallic element of the periodic table or a double compound of said oxide is used as an additive, said oxide or double compound of said oxide being capable of producing a supernatant having a total hardness of 100 mg/l or more (in terms of $CaCO_3$) as determined by chelatometric titration specified in the Water Supply Law when 100 parts by weight of said oxide or double compound of said oxide is brought into contact with 200 parts by weight of distilled water.

Representative compounds used as the additive in the present invention have a structure represented by the following general formula:

MY wherein M is a group IIa metallic element and Y is an oxygen atom group.

Specific examples of M as the group IIa metallic element include Be, Mg, Ca, Sr and Ba. Among them, Ca, Mg and Ba elements are particularly preferred. Specifically, representable examples of the additive used in the present invention include oxides of the group IIa elements (alkaline earth metals), such as CaO, MgO and BaO. Further, it is also favorable to use double compounds comprising a combination of two or more of the above-described oxides, or double compounds comprising a combination of the above-described oxide with an oxide or salt of other element, and there is no particular limitation on the double compound as far as an oxide of the group IIa element is contained therein. Representative examples of the double compound used in the present invention include the following compounds.

Specifically, they include cements such as hydraulic lime, roman cement, natural cement, portland cement, alumina cement, blast furnace cement, silica cement, fly ash cement, masonry cement, expansive cement and special cement, and blast furnace slags such as blast furnace residue, magnesium refining residue and ferrochromium residue, and representative examples of the chemical structure thereof include $mCaO.nSiO_2$, $mCaO.nAl_2O_3$, $mBaO.nAl_2O_3$, $lCaO.mAl_2O_3.nSiO_2$, $lCaO.mMgO.nSiO_2$, $mCaCO_3.nMgCO_3$, $mCaO.nFe_2O_3$ and $lCaO.mAl_2O_3.nFe_2O_3$, wherein l, m and n are zero or a combination of integers of zero or more.

In the present invention, the above-described oxides or double compounds used as the additive should produce a supernatant having a total hardness of 100 mg/l or more (in terms of $CaCO_3$) as determined by chelatometric titration prescribed in the Water Supply Law when 100 parts by weight of said oxide or double compound of said oxide is brought into contact with 200 parts by weight of distilled water.

The oxide or double compound of the present invention may be other materials satisfying the above-described requirement, such as fire clay raw materials, siliceous raw materials, iron oxide raw materials and other mineral raw materials.

The additive used in the present invention may be in the form of a sand grain, particularly may be used in the form of a powder or a solution or slurry dispersion thereof in water or other solvent. In order to promote the dissolution of metallic ions, it is preferred to reduce the particle diameter of the additive. In this case, the additive is in the form of a powder (flour) having a particle diameter of 50 μm or less. The use of the above-described additives alone or in a combination of two or more of them serves to exhibit the effect of improving the mold strength of the reclaimed sand.

The invention and the embodiments (1) to (3) may be conducted as shown below.

In order to make a sand casting mold by the self-hardening molding process in the present invention, 100 parts by weight of a reclaimed sand, 0.001 to 10 parts by weight, preferably 0.01 to 3 parts by weight of the additive according to the present invention, 0.05 to 9 parts by weight, preferably 0.1 to 5 parts by weight of an organic ester as a hardening agent, 0.4 to 15 parts by weight, preferably 0.6 to 5 parts by weight of an aqueous solution of a water-soluble phenolic resin are kneaded with each other according to a conventional process, and a mold can be made from the kneaded mixture by utilizing the conventional self-hardening molding process as it is. When the binder further comprises a silane coupling agent, the silane coupling agent is added in an amount of 0.001 to 1 part by weight, preferably 0.002 to 0.5 part by weight based on 100 parts by weight of the reclaimed sand and a mold can be made therefrom in the same way as described above.

Although the additive used in the present invention may be added in the form of a powder to a casting sand or its reclaimed sand, it is preferred to add the additive in such a manner that a solution or a slurry dispersion of the additive in water or a solvent is previously prepared and then added. Examples of the solvent include generally known solvents including lower alcohols, such as ethanol and propanol, and acetone.

In the present invention, a lactone or an organic ester derived from a monohydric or polyhydric alcohol having 1 to 10 carbon atoms and an organic carboxylic acid having 1 to 10 carbon atoms is used alone or in the form of a mixture as the organic ester. In the self-hardening molding process, it is preferred to use γ-butyrolactone, propionolactone, ε-caprolactone, ethyl formate, ethylene glycol diacetate, ethylene glycol monoacetate, triacetin, etc., while in the gas hardening molding process, it is preferred to use methyl formate.

The water-soluble phenolic resin used in the present invention is a resin hardenable with an organic ester, and examples thereof include phenolic resins prepared by reacting phenols including phenol, cresol, resorcinol, 3,5-xylenol, bisphenol A and other substituted phenols with formaldehyde, acetaldehyde, furfural and mixtures thereof in a large amount of an aqueous solution of an alkaline substance. It is also possible to co-condense a formaldehyde-condensable monomer, such as urea, melamine or cyclohexanone, in such a weight ratio that the co-condensation product does not become the major constituent units. Sodium hydroxide, potassium hydroxide, lithium hydroxide and mixtures thereof are suitable as the alkaline substance used in the production of the water-soluble phenolic resin, among which potassium hydroxide is most desirable.

Examples of the granular refractory material include silica sand mainly composed of quartz, chromite sand, zircon sand, olivine sand and alumina sand. In the present invention, the granular refractory materials may be a fresh sand or a reclaimed sand. In particular, a significant improvement in the mold strength can be attained when use is made of the reclaimed sand. Although the reclaimed sand used is usually one prepared by a conventional abrasion or roasting process, there is no particular limitation on the preparation of a reclaimed sand.

A silane coupling agent has hitherto been regarded as useful for improving the mold strength, so that it is widely used as a component of the binder. However, when a reclaimed sand wherein the above-described water-soluble phenolic resin is used as the binder is molded again, there occurs a problem that the mold strength gradually decreases with an increasing number of repetitions of the reclamation. The mold strength cannot be recovered unless the number of reclamation plates or reclamation efficiency of the reclaiming machine is increased. For this reason, the recovery-reclamation rate approaches 80 to 85%, which is remarkably lower than that in the case where use is made of an acid hardening resin.

The solution to the above-described problem obtained by using the additive in the present invention has not hitherto been known in the art.

Known silane coupling agents may be used as the silane coupling agent in the present invention, and preferred examples thereof include γ-aminopropyltriethoxysilane, γ-(2-aminoethyl)aminopropyltrimethoxysilane, and γ-glycidoxypropyltrimethoxysilane. In the present invention, it is preferred to use the silane coupling agent in combination with the binder.

EXAMPLE 1 TO 16 AND COMPARATIVE EXAMPLE 1, 2

Examples 1 to 8 and Comparative Example 1 were tested using the self-hardening molding process and Examples 9 to 16 and Comparative Example 2 were tested using the gas-hardening molding process Changes in the mold strength with time (hardening rate) in the self-hardening molding process were evaluated.

Specifically, a mixture prepared by kneading 0.15 part by weight of various powdery additives listed in Table 1, 0.375 part by weight of triacetin and 1.5 parts by weight of a water-soluble phenolic resin (solid content: 49%, weight-average molecular weight: 2300) containing 0.5% by weight (based on the phenolic resin) of γ-aminopropyltriethoxysilane with 100 parts by weight of a reclaimed sand comprising Freemantle silica sand was packed in a pattern for a test piece having a size of 50 mm in diameter and 50 mm in height to determine changes in the compressive strength after kneading with time.

Method of Preparing Reclaimed Sand 0.375 part by weight of triacetin as a curing agent and 1.5 parts by weight of a water-soluble phenolic resin (solid content: 49%, weight-average molecular weight: 2300) containing 0.5% by weight (based on the phenolic resin) of γ-aminopropyltriethoxysilane were kneaded with 100 parts by weight of a fresh sand comprising Freemantle silica sand to prepare a mixture, and a mold was formed from this mixture. FC-25 (S/M=3.5) was cast from the mold thus prepared, and a recovered sand was crushed by means of a crusher and reclaimed by making use of a model M rotary claimer manufactured by Nippon Chuzo K.K. (reclamation A, 2 passes). The above-described steps were repeated five times to prepare a reclaimed sand. The reclaimed sand was used for preparing a mold for the above-described test (the same method as that described above was used also in the following Examples and Comparative Example).

Changes in the mold strength with time (hardening rate) in the gas-hardening molding process were evaluated.

Specifically, a mixture prepared by kneading various additives having various concentrations listed in the Table and 2.5 parts by weight of a water-soluble phenolic resin (solid content: 49%, weight-average molecular weight: 2300) containing 0.5% by weight (based on the phenolic resin) of γ-glycidoxypropyltrimethoxysilane with 100 parts by weight of a reclaimed sand comprising Mikawa No. 6 silica sand was packed in a pattern for a test piece for gas hardening having a size of 50 mm in diameter×50 mm in height.

3.0 parts by weight of gaseous methyl formate was injected into this pattern to determine changes in the compressive strength with time after kneading.

EXAMPLE 17 TO 30 AND COMPARATIVE EXAMPLE 3 TO 5

Changes in the mold strength with time (hardening rate) in the self-hardening molding process were evaluated.

Specifically, a mixture prepared by kneading 0.375 part by weight of various additives listed in Table 2 in the form of an aqueous solution thereof or a dispersion having a concentration corresponding to 1 mol/l, 0.375 part by weight of triacetin and 1.5 parts by weight of a water-soluble phenolic resin (solid content: 49%, weight-average molecular weight: 2300) containing 0.5% by weight (based on the phenolic resin) of γ-aminopropyltriethoxysilane with 100 parts by weight of a reclaimed sand comprising Freemantle silica sand was packed in a pattern for a test piece having a size of 50 mm in diameter and 50 mm in height to determine changes in the compressive strength with time after kneading.

Comparative Example 4 was conducted by following Comparative Example 3 except that the phenol resin had a solid content of 40 wt. %. Comparative Example 5 was conducted by following Comparative Example 3 except that the reclaimed sand was treated with 0.024 parts by weight, based on sand, of a 40% wt. aqueous solution of gamma-aminopropyltriethoxysilane.

EXAMPLE 31 TO 52 AND COMPARATIVE EXAMPLE 6

Changes in the mold strength with time (hardening rate) in the self-hardening molding process were evaluated.

Specifically, a mixture prepared by kneading 0.375 part by weight of various additives listed in Table 3 in the form of an aqueous solution thereof or a dispersion having a concentration corresponding to 1 mol/l, 0.375 part by weight of triacetin and 1.5 parts by weight of a water-soluble phenolic resin (solid content: 49% weight-average molecular weight: 2300) containing 0.5% by weight (based on the phenolic resin) of γ-aminopropyltriethoxysilane with 100 parts by weight of a reclaimed sand comprising Mikawa No. 5 silica sand was packed in a pattern for a test piece having a size of 50 mm in diameter×50 mm in height to determine changes in the compressive strength with time after kneading.

EXAMPLES 43 TO 51 AND COMPARATIVE EXAMPLE 7

Changes in the mold strength with time (hardening rate) in the gas-hardening molding process were evaluated.

Specifically, a mixture prepared by kneading 1.20 parts by weight of various additives having various concentrations listed in Table 4 and 2.5 parts by weight of a water-soluble phenolic resin (solid content: 49%, weight-average molecular weight: 2300) containing 0.5% by weight (based on the phenolic resin) of γ-glycidoxypropyltrimethoxysilane with 100 parts by weight of a reclaimed sand comprising Mikawa No. 6 silica sand was packed in a pattern for a test piece having a size of 50 mm in diameter×50 mm in height.

3.0 parts by weight of gaseous methyl formate was injected into this pattern to determine changes in the compressive strength with time after kneading.

EXAMPLE 52 TO 62 AND COMPARATIVE EXAMPLE 8

Example 1 was followed using the self-hardening molding process except for additives.

Atomic Absorption Spectrometry 100 g of each of various additives used in the Examples and Comparative Examples was placed in a 300-cc beaker, and 200 g of distilled water was added thereto. Then, the container was hermetically sealed, and agitation was conducted for 15 min by means of a propeller agitator. 50 cc of the resultant supernatant was collected and subjected to centrifugal sedimentation by means of a centrifugal separator (manufactured by Hitachi, Ltd.; Model SCT4BE; 3,000 rpm×60 min) to confirm that the additives had no suspensibility, thereby preparing a test solution.

In the atomic absorption spectrometry, the metallic ion concentration of each test solution of the above-described various additives was analyzed in terms of the sum total of the concentrations (mg/l) of various metallic ions of Mg, Ca, Ba, Zn, Cd, Hg, Al, Cu, Zr, Ti, V, P, T-Cr, Mo, Mn, Fe, Co and Ni based on the Analytical Methods for Industrial Wastewater as specified in JIS 0102.

The measurement was conducted by making use of an atomic absorption photometer (manufactured by Shimadzu Corporation; Model AA-64012).

Method of Measuring Total Hardness (Divalent or Higher Metallic Ion)

1. Reagent:

(1) Magnesium chloride solution (0.01M):

Hydrochloric acid (1+9) was dropwise added to 0.403 g of magnesium oxide which had been previously ignited and allowed to stand for cooling in a desiccator, thereby dissolving magnesium oxide in hydrochloric acid. The solution was heated on a water bath until the odor of hydrochloric acid disappears, and distilled water was added to the solution in a total volume of 1 l.

(2) Ammonia buffer:

67.5 g of ammonium chloride was dissolved in 570 ml of aqueous ammonia, and distilled water was added thereto in a total volume of 1 l.

(3) Solution of EBT in ethanol:

0.5 g of Eriochrome Black T and 4.5 g of hydroxylamine hydrochloride were dissolved in ethanol (95 V/V %) in a total volume of 100 ml.

(4) EDTA solution (0.01 mol):

Disodium ethylenediaminetetraacetate (dehydrate) was dried at 80° C. for 5 hr and allowed to stand for cooling in a desiccator, and 3.722 g of the cooled disodium ethylenediaminetetraacetate was dissolved in distilled water in a total volume of 1 l.

1 ml of this solution contains 1 mg of calcium carbonate.

This solution is stored in a brown bottle.

2. Sampling and storage of sample:

The sampling and storage were conducted according to a method of measuring a chlorine ion.

3. Test procedure:

100 ml of a properly diluted test water (a test water containing 10 mg or less of metallic ions in terms of calcium carbonate or a solution prepared by adding distilled water to a test water so that the solution contains 10 mg or less of metallic ions in terms of calcium carbonate in a total volume of 100 ml) was placed in a conical flask, and 1 ml of a magnesium chloride solution and 2 ml of ammonia buffer were added to the solution. A few drops of the solution of EBT in ethanol were added as an indicator, and titration was conducted through the use of the EDTA solution (0.01M) until the color turned from purplish red to blue. From the amount (ml), a, of the EDTA solution (0.01M) necessary for the titration, the hardness of the test water is calculated in terms of the amount (mg/l) of calcium carbonate contained in the test water by the following equation.

$$\text{calcium carbonate (mg/l)} = (a - 1) \times \frac{1000}{\text{test water (ml)}}$$

The results are shown in Table 5.

EXAMPLE 63 TO 71 AND COMPARATIVE EXAMPLE 9

Changes in the mold strength with time (hardening rate) in the self-hardening molding process were evaluated.

Specifically, a mixture prepared by kneading 0.15 part by weight of each additive listed in Table 6, 0.375 part by weight of triacetin and 1.5 parts by weight of a water-soluble phenolic resin (solid content: 49% weight-average molecular weight: 2300) containing 0.5% by weight (based on the phenolic resin) of γ-aminopropyltriethoxysilane with 100 parts by weight of a reclaimed sand comprising Mikawa No. 5 silica sand was packed in a pattern for a test piece having a size of 50 mm in diameter×50 mm in height to determine changes in the compressive strength after kneading with time. The results are given in Table 6.

EXAMPLE 72 TO 78 AND COMPARATIVE EXAMPLE 10

Example 9 was followed using the gas-hardening molding process except for additives. The results are shown in Table 7.

EXAMPLE 79 TO 112 AND COMPARATIVE EXAMPLE 11

The self-curing molding tests were carried out in the same way as shown in Example 1 except for using 0.30 part by weight of additives shown in Table 8. The additives tested here include organic metal compound, nitrides, metal alkoxides, hydrogenated products, carbonates, a metal imide, peroxides, a sulfide, a phosphate, a nitro compound, an anilide, phenolates, a hexa-ammonium compound, ferrocenes, analogs of ferrocenes, dibenzene chromiums, analogs of dibenzene chromiums, inorganic hetero-polymers, metal carbonyls, inclusion compounds, metal complexes, and others. Results are shown in terms of compressive strength in 24 hours.

EXAMPLE 113 TO 146 AND COMPARATIVE EXAMPLE 12

The gas-curing molding tests were carried out in the same way as shown in Example 1 except for using 0.30 part by weight of additives shown in Table 9. The same additives as tested in Examples 79 to 112 were tested here, too. Results are shown in terms of compressive strength in 24 hours.

EXAMPLES 147 TO 162 AND COMPARATIVE EXAMPLES 13 AND 14

Changes in the mold strength with time (curing) in the self-curing molding process were evaluated.

Specifically, a mixture prepared by kneading 0.12 part by weight of various additives listed in Table 10 in the form of an aqueous solution thereof having a solid content of 40% by weight, 0.375 part by weight of ethylene glycol diacetate and 1.5 parts by weight of a water-soluble phenolic resin (solid content: 49%, weight-average molecular weight: 2300) containing 0.5% by weight (based on the phenolic resin) of γ-aminopropyltriethoxysilane with 100 parts by weight of a reclaimed sand comprising Freemantle silica sand was packed in a pattern for a test piece having a size of 50 mm in diameter and 50 mm in height to determine changes in the compressive strength with time after kneading.

Examples 147 to 158 demonstrate the addition of amino carboxylic acid chelate compounds of EDTA to a reclaimed sand and the use of group IB to VIII metallic elements.

Example 159 demonstrates the use of hydroxycarboxylic acid type chelate compounds.

Example 160 demonstrates the use of polycarboxylic acid type chelate compounds.

Example 161 and 162 demonstrate the use of phosphonic acid type chelate compounds, and a chelating compound of acetylacetone type, respectively.

Comparative Example 13 demonstrates the addition of sodium salt, i.e., an alkali metal salt, of EDTA to a reclaimed sand.

Comparative Example 14 demonstrates no addition of any additive.

Examples 163 to 181 and Comparative Examples 15 to 19

Changes in the mold strength with time (hardening rate) in the self-hardening molding process were evaluated.

Specifically, a mixture prepared by kneading 0.375 part by weight of ethylene glycol diacetate and 1.5 parts by weight of a water-soluble phenolic resin (solid content: 49%, weight average molecular weight: 2300) containing 3.2% by weight (based on the phenolic resin) of "compound dissolved in water-soluble phenolic resin" listed in Table 11 and 0.5% by weight (based on the phenolic resin) of γ-aminopropyltriethoxysilane with 100 parts by weight of a reclaimed sand comprising Freemantle silica sand was packed in a pattern for a test piece having a size of 50 mm in diameter×50 mm in height to determine changes in the compressive strength with time after kneading. Further, the water-soluble phenolic resin samples were stored in a thermostat at 35° C., and the storage stability after 7 days was observed.

Examples 163 to 174 demonstrate the incorporation of amino carboxylic acid chelate compounds in a water-soluble phenolic resin and the use of group IB to VIII metallic elements.

Examples 175 to 177 demonstrate the use of hydroxycarboxylic acid type chelate compounds.

Examples 178 and 179 demonstrate the use of polycarboxylic acid type chelate compounds.

Examples 180 and 181 demonstrate phosphonic acid type chelate compounds.

Comparative Examples 15 to 17 demonstrate the dissolution of inorganic salts, organic salts and hydroxides in a water-soluble phenolic resin, and Comparative Example 18 demonstrates the dissolution of sodium salt, i.e., an alkali metal salt, of EDTA in a water-soluble phenolic resin. Comparative Example 19 demonstrates no addition of any additive. The results obtained are shown in Table 12.

EXAMPLES 182 TO 194 AND COMPARATIVE EXAMPLE 20 AND 21

Changes in the mold strength with time (hardening rate) in the self-hardening molding process were evaluated.

Specifically, a mixture prepared by kneading 0.12 part by weight of various additives listed in Table 13, 0.375 part by weight of ethylene glycol diacetate and 1.5 parts by weight of a water-soluble phenolic resin (solid content: 49%, weight-average molecular weight: 2300) containing 0.5% by weight (based on the phenolic resin) of γ-aminopropyltriethoxysilane with 100 parts by weight of a reclaimed sand comprising Mikawa No. 5 silica sand was packed in a pattern for a test piece having a size of 50 mm in diameter× 50 mm in height to determine changes in the compressive strength with time after kneading.

Examples 182 to 189 demonstrate the addition of various amino carboxylic acid type chelate compounds comprising groups II and VIII metallic elements of the periodic table to a reclaimed sand.

Examples 190 to 194 demonstrate the addition of sodium salt of EDTA as a sequestering agent or Zn salt of EDTA as a chelate compound and inorganic salts and organic salts comprising group II metallic elements of the periodic table to a reclaimed sand with varied molar ratios of the sequestering agent or chelate compound to the salts.

Comparative Example 20 demonstrates the addition of potassium salt of EDTA to a reclaimed sand. Comparative Example 21 demonstrates no addition of any additive.

EXAMPLES 195 TO 207 AND COMPARATIVE EXAMPLES 22 TO 26

Changes in the mold strength with time (hardening rate) in the self-hardening molding process were evaluated.

Specifically, a mixture prepared by kneading 0.375 part by weight of ethylene glycol diacetate and 1.5 parts by weight of a water-soluble phenolic resin (solid content: 49, weight-average molecular weight: 2300) containing 3.2% by weight (based on the phenolic resin) of "compound dissolved in water-soluble phenolic resin" listed in Table 14 and 0.5% by weight (based on the phenolic resin) of γ-aminopropyltriethoxysilane with 100 parts by weight of a reclaimed sand comprising Mikawa No. 5 silica sand was packed in a pattern for a test piece having a size of 50 mm in diameter×50 mm in height to determine changes in the compressive strength with time after kneading.

Further, the water-soluble phenolic resin samples were stored in a thermostat at 35° C., and the storage stability after 7 days was observed.

Examples 195 to 202 demonstrate the dissolution of various amino carboxylic acid type chelate compounds comprising groups II and VIII metallic elements of the periodic table in a water-soluble phenolic resin.

Examples 203 to 207 demonstrate the dissolution of the sodium salt of EDTA as a sequestering agent or the zinc salt of EDTA as a chelate compound and inorganic salts and organic salts comprising group II metallic elements of the periodic table in a water-soluble phenolic resin with varied molar ratios of the sequestering agent or chelate compound to the salts.

Comparative Example 22 demonstrates the dissolution of an inorganic salt in a water-soluble phenolic resin, Comparative Example 23 the dissolution of an organic salt in a water-soluble phenolic resin, Comparative Example 24 the dissolution of a hydroxide in a water-soluble phenolic resin, and Comparative Example 25 the dissolution of potassium salt of EDTA in a water-soluble phenolic resin. Comparative Example 26 demonstrates no addition of any additive.

EXAMPLES 208 TO 216 AND COMPARATIVE EXAMPLES 27 TO 29

Changes in the mold strength with time (hardening rate) in the gas-hardening molding process were evaluated.

Specifically, a mixture prepared by kneading various additives listed in Table 15 in various concentrations specified in the Table and 2.5 parts by weight of a water-soluble phenolic resin (solid content: 49%, weight average molecular weight: 2300) containing 0.5% by weight (based on the phenolic resin) of γ-glycidoxypropyltrimethoxysilane with 100 parts by weight of a reclaimed sand comprising Mikawa No. 6 silica sand was packed in a pattern for a test piece having a size of 50 mm in diameter×50 mm in height.

3.0 parts by weight of gaseous methyl formate was injected into this pattern to determine changes in the compressive strength with time after kneading.

Examples 208 to 213 demonstrate the addition of various amino carboxylic acid type chelate compounds comprising group II metallic elements of the periodic table to a reclaimed sand in such amounts as will provide concentrations specified in the Table.

Examples 214 to 216 demonstrate the addition of sodium salt of EDTA and an inorganic salt and an organic salt comprising group II metallic elements of the periodic table in molar ratios specified in the Table to a reclaimed sand.

Comparative Example 21 demonstrates the addition of potassium salt of EDTA and NaCl, i.e., a group I alkali metal salt to a reclaimed sand. Comparative Example 22 demonstrates the addition of sodium salt of EDTA and KCl, i.e., a group I alkali metal salt to a reclaimed sand. Comparative Example 23 demonstrates no addition of any additive.

EXAMPLES 217 TO 225 AND COMPARATIVE EXAMPLES 30 TO 32

Changes in the mold strength with time (hardening rate) in the gas-hardening molding process were evaluated.

Specifically, a mixture prepared by kneading 2.5 parts by weight of a water-soluble phenolic resin (solid content: 49%, weight average molecular weight: 2300) containing "compound dissolved in water-soluble phenolic resin" listed in Table 16 and 0.5% by weight (based on the phenolic resin) of γ-glycidoxypropyltrimethoxysilane with 100 parts by weight of a reclaimed sand comprising Mikawa No. 6 silica sand was packed in a pattern for a test piece having a size of 50 mm in diameter×50 mm in height. 3.0 parts by weight of gaseous methyl formate was injected into this pattern to determine changes in the compressive strength with time after kneading. Further, the water-soluble phenolic resin samples were stored in a thermostat at 35° C., and the storage stability after 7 days was observed.

Examples 217 to 222 demonstrate the dissolution of various amino carboxylic acid type chelate compounds comprising group II metallic elements in a water-soluble phenolic resin in such amounts as will provide concentrations specified in the Table.

Examples 229 to 225 demonstrate the addition of a sodium salt of EDTA and an inorganic salt or an organic said comprising group II metallic elements of the periodic table in molar ratios specified in the Table to a water-soluble phenolic resin.

Comparative Example 30 demonstrates the dissolution of potassium salt of EDTA and NaCl, i.e., a group I alkali metal salt in a water-soluble phenolic resin. Comparative Example 31 demonstrates the dissolution of sodium salt of EDTA and $MgCl_2$, i.e., a group II metal salt, in a water-soluble phenolic resin. Comparative Example 32 demonstrates no addition of any additive.

TABLE 1

| No. | additive | compressive strength (kg/cm2) sand temp: 25° C. humidity: 60% RH after 24 hours |
|---|---|---|
| Example | | |
| 1 | Zn powder | 29.5 |
| 2 | Ni powder | 24.7 |
| 3 | Fe powder | 23.1 |
| 4 | Mn powder | 21.8 |
| 5 | Cu powder | 20.1 |
| 6 | duralumin | 30.1 |
| 7 | magnalium | 28.7 |
| 8 | ferromanganese | 27.1 |
| Comparative Example 1 | no | 12.0 |
| Example | | |
| 9 | Zn powder | 23.3 |
| 10 | Ni powder | 21.6 |
| 11 | Fe powder | 21.1 |
| 12 | Mn powder | 18.4 |
| 13 | Cu powder | 17.7 |
| 14 | duralumin | 28.5 |
| 15 | magnalium | 25.2 |
| 16 | ferromanganese | 25.1 |
| Comparative Example 2 | no | 9.4 |

TABLE 2

| | Additive | Compressive strength (kg/cm$^2$) room temp.: 25° C., humidity: 60% RH | | |
|---|---|---|---|---|
| | | after 0.5 hr | after 1 hr | after 24 hr |
| Ex. | | | | |
| 17 | $CaCl_2$ | 8.0 | 11.0 | 30.2 |
| 18 | $MgCl_2$ | 5.4 | 8.6 | 21.5 |
| 19 | $BaCl_2.6H_2O$ | 7.3 | 9.3 | 20.3 |
| 20 | $CuCl_2.2H_2O$ | 4.5 | 7.2 | 15.2 |
| 21 | $ZnCl_2$ | 7.2 | 10.5 | 29.5 |
| 22 | $CaBr_2.2H_2O$ | 7.0 | 9.0 | 26.2 |
| 23 | $AlF_3$ | 3.2 | 6.0 | 10.2 |
| 24 | $VCl_3$ | 3.2 | 5.5 | 15.2 |
| 25 | $MoCl_5$ | 4.8 | 7.2 | 20.7 |
| 26 | $MnCl_2.4H_2O$ | 2.5 | 6.5 | 18.2 |
| 27 | $FeCl_2$ | 4.4 | 9.3 | 27.0 |
| 28 | $NiCl_2.6H_2O$ | 7.2 | 9.7 | 29.2 |
| Comp. Ex. 3 | none | 2.0 | 4.2 | 6.6 |
| Ex. | | | | |
| 29 | K, Al-alum | 7.5 | 12.7 | 29.7 |
| 30 | $Zn(OH)_2$ | 6.2 | 11.8 | 28.9 |
| Comp. | | | | |
| 4 | no | 0.2 | 1.1 | 5.9 |
| 5 | no | 2.0 | 4.4 | 7.0 |

TABLE 3

| | Additive | Compressive strength (kg/cm$^2$) room temp.: 25° C., humidity: 60% RH | | |
|---|---|---|---|---|
| | | after 0.5 hr | after 1 hr | after 24 hr |
| Ex. | | | | |
| 31 | $CaCl_2$ | 5.6 | 6.4 | 21.2 |
| 32 | $CaSO_4.2H_2O$ | 5.2 | 6.0 | 14.2 |
| 33 | $CaCO_3$ | 5.2 | 6.4 | 20.5 |
| 34 | $Mg_3(PO_4)_2.8H_2O$ | 3.9 | 5.2 | 15.0 |
| 35 | $CaHPO_4.2H_2O$ | 5.1 | 5.5 | 17.1 |
| 36 | $Ca(HCOO)_2$ | 5.4 | 6.0 | 18.5 |
| 37 | $MgC_2O_4.2H_2O$ | 5.0 | 5.9 | 17.2 |
| 38 | calcium toluene-sulfonate | 3.2 | 4.2 | 18.2 |
| 39 | $Ca(OH)_2$ | 5.0 | 6.0 | 15.5 |
| 40 | $CaCl_2/MgC_2O_4.2H_2O = 1/1$ (corresponding to 1 mol/l) | 5.3 | 6.2 | 20.6 |
| 41 | $CaCl_2/Ca(OH)_2 = 1/1$ (corresponding to 1 mol/l) | 5.2 | 6.3 | 18.5 |
| Comp. Ex. 6 | none | 2.5 | 3.0 | 4.5 |
| Ex. 42 | K,Al-alum | 5.7 | 6.7 | 18.7 |

TABLE 4

| | | Compressive strength (kg/cm²) room temp.: 25° C., humidity: 60% RH | | |
|---|---|---|---|---|
| | Additive | after 1 min | after 5 min | after 24 hr |
| Ex. | | | | |
| 43 | 0.5 mol/l CaCl$_2$ | 13.4 | 16.5 | 20.1 |
| 44 | 1 mol/l CaCl$_2$ | 16.0 | 17.5 | 22.3 |
| 45 | 2 mol/l CaCl$_2$ | 17.5 | 18.4 | 23.0 |
| 46 | 1 mol/l ZnCl$_2$ | 12.1 | 13.2 | 14.0 |
| 47 | 1 mol/l Ca(HCOO)$_2$ | 15.2 | 17.1 | 20.2 |
| 48 | 1 mol/l Mg$_2$O$_4$.2H$_2$O | 15.0 | 16.0 | 19.2 |
| 49 | 1 mol/l Mg(OH)$_2$ | 14.1 | 15.2 | 18.2 |
| 50 | 2 mol/l Mg(OH)$_2$ | 16.0 | 17.2 | 20.5 |
| Comp. Ex. 7 | none | 8.0 | 8.5 | 9.0 |
| Ex. 51 | 1 mol/l K, Al-alum | 14.1 | 17.2 | 19.5 |

TABLE 5

| | Additive | Metallic ion concn. as determined by atomic absorption spectrometry (mg/l) | Total hardness according to Water Supply Law (in terms of CaCO$_3$) | Compressive strength (kg/cm²) room temp. 25° C. humidity: 60% RH | | |
|---|---|---|---|---|---|---|
| | | | | after 30 min | after 1 hr | after 24 hr |
| Ex. | | | | | | |
| 54 | CaO flour | 110503 | 232400 | 7.1 | 12.1 | 25.0 |
| 55 | MgO flour | 672.8 | 1700 | 3.2 | 6.2 | 17.2 |
| 56 | BaO flour | 650.0 | 2500 | 3.0 | 5.8 | 15.2 |
| 57 | CaO.Al$_2$O$_3$ flour | 530 | 1520 | 4.2 | 6.0 | 21.0 |
| 58 | portland cement | 661.0 | 1800 | 6.3 | 10.0 | 32.0 |
| 59 | alumina cement | 620 | 1650 | 6.0 | 9.0 | 28.5 |
| 60 | 2CaO.SiO$_2$ flour (mean particle diameter: 30 μm) | 640.4 | 620 | 4.1 | 7.2 | 17.8 |
| 61 | 2CaO.SiO$_2$ flour (mean particle diameter: 100 μm) | 80.5 | 175 | 3.2 | 6.5 | 10.2 |
| Comp. Ex. 8 | none | — | — | 2.0 | 4.2 | 6.6 |
| Ex. | | | | | | |
| 52 | Al$_2$O$_3$ flour | 320.1 | 1210 | 7.5 | 14.1 | 36.0 |
| 53 | ZnO flour | 690.8 | 1900 | 7.1 | 12.1 | 25.0 |
| 62 | 2CaO.SiO$_2$ flour (mean particle diameter: 200 m) | 11.5 | 80 | 1.5 | 3.3 | 6.1 |
| Comp. Ex. | | | | | | |
| 8-1 | silica flour | 3.2 | 11.5 | 2.1 | 4.4 | 6.7 |
| 8-2 | B$_2$O$_2$ flour | 23.5 | 95 | 3.2 | 6.8 | 7.8 |
| 8-3 | Sb$_2$O$_3$ flour | 18.7 | 81 | 2.8 | 5.9 | 7.0 |

TABLE 6

| | Additive | Metallic ion concn. as determined by atomic absorption spectrometry (mg/l) | Total hardness according to Water Supply Law (in terms of CaCO$_3$) | Compressive strength (kg/cm²) room temp. 25° C. humidity: 60% RH | | |
|---|---|---|---|---|---|---|
| | | | | after 30 min | after 1 hr | after 24 hr |
| Ex. | | | | | | |
| 65 | CaO flour | 110503 | 232400 | 5.0 | 5.5 | 17.1 |
| 66 | MgO flour | 672.8 | 1700 | 4.3 | 5.3 | 16.2 |
| 67 | portland cement | 661.1 | 1800 | 5.5 | 6.0 | 20.0 |
| 68 | blast furnace cement | 550 | 1520 | 5.2 | 5.5 | 20.0 |
| 69 | 2CaO.SiO$_2$ flour | 640.4 | 620 | 5.0 | 5.4 | 16.5 |
| 70 | CaO flour/portland cement = 1:1 | 57600 | 123010 | 5.4 | 5.8 | 20.0 |
| 71 | CaO flour/MgO flour = 1:1 | 56080 | 122500 | 4.3 | 5.3 | 16.5 |
| Comp. Ex. | | | | | | |
| 9-1 | silica flour | 3.2 | 11.5 | 2.2 | 3.0 | 4.0 |
| 9 | none | — | — | 2.5 | 3.0 | 4.5 |
| Ex. | | | | | | |

TABLE 6-continued

|    | Additive | Metallic ion concn. as determined by atomic absorption spectrometry (mg/l) | Total hardness according to Water Supply Law (in terms of $CaCO_3$) | Compressive strength ($kg/cm^2$) room temp. 25° C. humidity: 60% RH | | |
|----|----------|---|---|---|---|---|
|    |          |   |   | after 30 min | after 1 hr | after 24 hr |
| 63 | $Al_2O_3$ flour | 320.1 | 1210 | 6.7 | 9.5 | 30.0 |
| 64 | ZnO flour | 690.8 | 1900 | 4.8 | 5.3 | 20.2 |

TABLE 7

|  | Additive | Metallic ion concn. as determined by atomic absorption spectrometry (mg/l) | Total hardness according to Water Supply Law (in terms of $CaCO_3$) | Compressive strength ($kg/cm^2$) room temp. 25° C. humidity: 60% RH | | |
|---|---|---|---|---|---|---|
|  |  |  |  | after 1 min | after 5 min | after 24 hr |
| Ex. |  |  |  |  |  |  |
| 74 | 0.30 pt. wt. CaO flour | 110503 | 232400 | 15.6 | 17.8 | 19.5 |
| 75 | 0.15 pt. wt. portland cement | 661.0 | 1800 | 17.2 | 19.5 | 23.5 |
| 76 | 0.30 pt. wt. portland cement | 661.0 | 1800 | 18.0 | 21.0 | 24.0 |
| 77 | 0.15 pt. wt. fly ash cement | 750 | 1720 | 16.2 | 18.2 | 19.5 |
| 78 | 0.15 pt. wt. $2CaO.SiO_2$ flour | 640.4 | 620 | 15.5 | 17.0 | 18.2 |
| Comp. Ex. |  |  |  |  |  |  |
| 10-1 | 0.15 pt. wt. silica flour | 3.2 | 11.5 | 7.8 | 8.0 | 8.2 |
| 10 | none |  |  |  |  |  |
| Ex. |  |  |  |  |  |  |
| 72 | 0.15 pt. wt. $Al_2O_3$ flour | 320.1 | 1210 | 17.5 | 20.8 | 21.0 |
| 73 | 0.15 pt. wt. ZnO flour | 690.8 | 1900 | 16.2 | 20.2 | 21.0 |

TABLE 8

|  | additives | compressive strength |
|---|---|---|
| Ex. |  |  |
| 79 | Al(C2H2)3 | 22.3 |
| 80 | C2H5MgBr | 20.3 |
| 81 | Zn3N2 | 10.1 |
| 82 | AlN | 13.7 |
| 83 | Al[OCH(CH3)2]3 | 31.9 |
| 84 | Zn(OCH3)2 | 29.3 |
| 85 | CaH2 | 12.6 |
| 86 | BaH2 | 11.3 |
| 87 | Al4C3 | 14.2 |
| 88 | CaC2 | 13.6 |
| 89 | Ca(NH2)2 | 15.3 |
| 90 | CaO2 | 19.8 |
| 91 | BaO2 | 11.2 |
| 92 | ZnS | 21.2 |
| 93 | AlP | 23.4 |
| 94 | CuNO2 | 10.8 |
| 95 | Al(NHPh)3 | 16.3 |
| 96 | Al-phenolate | 30.1 |
| 97 | Ca-phenolate | 29.2 |
| 98 | Ca(NH3)6 | 12.3 |
| 99 | FeCp2 | 10.6 |
| 100 | ZnCp2 | 22.1 |
| 101 | [Cr(C6H6)2] | 10.0 |
| 102 | [V(C6H6)2] | 10.2 |
| 103 | hydrogenated aluminum polymer | 28.7 |
| 104 | zeolite | 19.0 |
| 105 | [Ni(CO)4] | 10.3 |
| 106 | [Mn2(CO)10] | 10.2 |
| 107 | Ca complex of dibenzo-18-crown-6 | 11.2 |
| 108 | Ca.complex of cryptand [2.2.2] | 10.7 |
| 109 | [Al(C2O4)3]Cl3 | 20.1 |
| 110 | [Zn(NH3)6]Cl2 | 19.3 |
| 111 | zircoaluminate | 31.1 |
| 112 | carboxypeptitase A | 10.0 |
| Com. Ex. 11 | no | 6.4 |

TABLE 9

|  | additives | compressive strength |
|---|---|---|
| Ex. |  |  |
| 113 | Al(C2H2)3 | 16.2 |
| 114 | C2H5MgBr | 15.2 |
| 115 | Zn3N2 | 10.1 |
| 116 | AlN | 11.3 |
| 117 | Al[OCH(CH3)2]3 | 28.9 |

TABLE 9-continued

| | additives | compressive strength |
|---|---|---|
| 118 | Zn(OCH3)2 | 27.2 |
| 119 | CaH2 | 10.6 |
| 120 | BaH2 | 10.3 |
| 121 | Al4C3 | 11.2 |
| 122 | CaC2 | 11.0 |
| 123 | Ca(NH2)2 | 13.2 |
| 124 | CaO2 | 14.1 |
| 125 | BaO2 | 10.0 |
| 126 | ZnS | 16.2 |
| 127 | AlP | 17.1 |
| 128 | CuNO2 | 10.0 |
| 129 | Al(NHPh)3 | 12.1 |
| 130 | Al-phenolate | 27.2 |
| 131 | Ca-phenolate | 23.2 |
| 132 | Ca(NH3)6 | 10.4 |
| 133 | FeCp2 | 10.1 |
| 134 | ZnCp2 | 18.7 |

TABLE 9-continued

| | additives | compressive strength |
|---|---|---|
| 135 | [Cr(C6H6)2] | 10.2 |
| 136 | [V(C6H6)2] | 10.1 |
| 137 | hydrogenated aluminum polymer | 21.7 |
| 138 | zeolite | 20.9 |
| 139 | [Ni(CO)4] | 10.2 |
| 140 | [Mn2(CO)10] | 10.4 |
| 141 | Ca complex of dibenzo-18-crown-6 | 10.3 |
| 142 | Ca.complex of cryptand [2.2.2] | 10.7 |
| 143 | [Al(C2O4)3]Cl3 | 16.4 |
| 144 | [Zn(NH3)6]Cl2 | 15.3 |
| 145 | zircoaluminate | 29.9 |
| 146 | carboxypeptitase A | 12.0 |
| Com. Ex. 12 | no | 8.7 |

TABLE 10

| | | | Various additives | Compressive strength (kg/cm$^2$) room temp.: 25° C., humidity: 60% RH | | |
|---|---|---|---|---|---|---|
| | | | | after 0.5 hr | after 1 hr | after 24 hr |
| Ex. | amino carboxylic acid type | 147 | EDTA Na2Cu | 2.1 | 5.6 | 11.0 |
| | | 148 | EDTA Na2Ca | 6.0 | 15.3 | 23.0 |
| | | 149 | EDTA Na2Mg | 9.2 | 16.5 | 35.2 |
| | | 150 | EDTA Na2Zn | 8.6 | 18.0 | 38.2 |
| | | 151 | EDTA NaAl | 4.5 | 6.8 | 16.5 |
| | | 152 | EDTA NaTi | 3.7 | 5.8 | 14.0 |
| | | 153 | EDTA Na2V | 3.3 | 6.0 | 17.3 |
| | | 154 | EDTA Na2Cr | 3.8 | 6.3 | 16.5 |
| | | 155 | EDTA Na2Mn | 3.2 | 5.5 | 10.2 |
| | | 156 | EDTA NaFe | 6.9 | 10.0 | 23.5 |
| | | 157 | EDTA NaCo | 7.8 | 10.1 | 21.5 |
| | | 158 | EDTA Na2Ni | 6.6 | 8.2 | 23.2 |
| | hydroxy carboxylic acid type | 159 | calcium gluconate | 2.5 | 6.0 | 17.0 |
| | polycarboxylic acid type | 160 | polyacrylic acid K/Ca salt molar ratio: K/Ca = 1:0.2 molecular weight: MW = 3,000 | 2.5 | 5.5 | 13.8 |
| | phosphonic acid type | 161 | calcium nitrilotris-methylenephosphonate | 3.5 | 7.2 | 16.0 |
| | acetylacetone type | 162 | acetylacetone Al salt | 4.8 | 8.9 | 21.9 |
| Comp. Ex. | EDTA Na salt | 13 | EDTA Na4 | 1.7 | 4.4 | 7.0 |
| | | 14 | none | 1.7 | 4.0 | 6.4 |

TABLE 11

| | | | Compound dissolved in water-soluble phenolic resin | Compressive strength (kg/cm$^2$) room temp.: 25° C., humidity: 60% RH | | | Storage stability (after 7 days, at 35° C.) |
|---|---|---|---|---|---|---|---|
| | | | | after 0.5 hr | after 1 hr | after 24 hr | |
| Ex. | amino carboxylic acid type | 163 | EDTA Na2Cu | 1.9 | 5.0 | 9.8 | good: homogeneous and tarnsparent |
| | | 164 | EDTA Na2Ca | 5.4 | 14.2 | 21.2 | " |
| | | 165 | EDTA Na2Mg | 8.3 | 15.2 | 32.3 | " |
| | | 166 | EDTA Na2Zn | 7.8 | 17.4 | 36.4 | " |
| | | 167 | EDTA NaAl | 4.2 | 6.2 | 15.2 | " |
| | | 168 | EDTA NaTi | 3.5 | 5.2 | 13.2 | " |
| | | 169 | EDTA Na2V | 3.0 | 5.5 | 16 | " |
| | | 170 | EDTA Na2V | 3.8 | 6.0 | 15.7 | " |
| | | 171 | EDTA Na2Mn | 3.0 | 5.2 | 9.2 | " |
| | | 172 | EDTA NaFe | 6.5 | 9.0 | 21.2 | " |

TABLE 11-continued

| | | Compound dissolved in water-soluble phenolic resin | Compressive strength (kg/cm²) room temp.: 25° C., humidity: 60% RH | | | Storage stability (after 7 days, at 35° C.) |
|---|---|---|---|---|---|---|
| | | | after 0.5 hr | after 1 hr | after 24 hr | |
| hydroxy carboxylic acid type | 173 | EDTA NaCo | 7.2 | 9.5 | 20.2 | " |
| | 174 | EDTA Na₂Ni | 6.0 | 7.5 | 20.8 | " |
| | 175 | calcium gluconate | 2.5 | 5.5 | 14.4 | " |
| | 176 | calcium tartrate | 3.0 | 6.0 | 12.5 | " |
| | 177 | calcium nitrate | 2.4 | 5.2 | 10.7 | slight separation from supernatant |

TABLE 12

| | | | Compound dissolved in water-soluble phenolic resin | Compressive strength (kg/cm²) room temp.: 25° C., humidity: 60% RH | | | Storage stability (after 7 days, at 35° C.) |
|---|---|---|---|---|---|---|---|
| | | | | after 0.5 hr | after 1 hr | after 24 hr | |
| Ex. | polycarboxylic acid type | 178 | polyacrylic acid K/Ca salt molar ratio: K/Ca = 1:1.2 molecular weight: Mw = 3,000 | 2.5 | 5.5 | 13.5 | suspended |
| | | 179 | polyacrylic acid-maleic acid copolymer K/Ca salt molar ratio: K/Ca = 1:0.2 molecular weight: Mw = 1,500 | 2.8 | 6.0 | 15.2 | " |
| | phosphonic acid type | 180 | calcium hydroxyethanediphosphonate | 2.5 | 6.3 | 14.0 | good: homogeneous and transparent |
| | | 181 | calcium nitrilotrismethylenephosphonate | 3.5 | 7.1 | 15.3 | " |
| Comp. Ex. | inorganic salt | 15 | calcium chloride | 1.8 | 4.6 | 9.2 | gelled state |
| | organic salt | 16 | calcium acetate | 2.0 | 4.7 | 9.5 | " |
| | hydroxide | 17 | calcium hydroxide | 1.9 | 4.5 | 8.1 | " |
| | EDTA Na salt | 18 | EDTA Na₄ | 1.7 | 4.2 | 6.8 | good: homogeneous and transparent |
| | | 19 | none | 1.7 | 4.0 | 6.4 | " |

TABLE 13

| | | | Various additives | Compressive strength (kg/cm²) room temp.: 25° C., humidity: 60% RH | | |
|---|---|---|---|---|---|---|
| | | | | after 0.5 hr | after 1 hr | after 24 hr |
| Ex. | amino carboxylic acid type | 182 | EDTA Na₂Ca | 3.0 | 6.5 | 15.2 |
| | | 183 | NTA Na Ca | 4.0 | 7.7 | 16.5 |
| | | 184 | EDTA Na₂Mg | 6.0 | 11.0 | 27.2 |
| | | 185 | EDTA Na₂Zn | 7.0 | 13.0 | 35.0 |
| | | 186 | NTA Na Zn | 7.1 | 14.0 | 37.0 |
| | | 187 | DTPA Na₂Zn | 7.9 | 16.5 | 40.0 |
| | | 188 | TTHA Na₄Zn | 6.8 | 13.0 | 37.8 |
| | | 189 | EDTA Na₂Fe | 4.0 | 7.2 | 14.2 |
| | salt of EDTA and inorganic salt or organic | 190 | EDTANa₄/CaCl₂ molar ratio = 1:1 | 4.5 | 6.9 | 17.0 |
| | | 191 | EDTANa₂/CaCl₂ molar ratio = 1:1.5 | 4.8 | 8.5 | 27.0 |
| | | 192 | EDTANa₄/(CH₃COO)₂Ca molar ratio = 1:2.5 | 7.2 | 13.1 | 35.2 |
| | | 193 | EDTANa₄/ZnCl₂ molar ratio = 1:1 | 7.1 | 16.0 | 36.4 |
| | | 194 | EDTANa₂Zn/MgCl₂ molar ratio = 1:0.25 | 6.8 | 14.8 | 33.3 |
| Comp. Ex. | EDTA Na salt | 20 | EDTA K₄ | 3.0 | 3.3 | 4.8 |
| | | 21 | none | 2.4 | 2.7 | 4.5 |

TABLE 14

| | | | Compound dissolved in water-soluble phenolic resin | Compressive strength (kg/cm²) room temp.: 25° C., humidity: 60% RH | | | Storage stability (after 7 days, at 35° C.) |
|---|---|---|---|---|---|---|---|
| | | | | after 0.5 hr | after 1 hr | after 24 hr | |
| Ex. | amino carboxylic acid type | 195 | EDTA Na₂Ca | 2.8 | 5.5 | 13.5 | good: homogeneous and transparent |
| | | 196 | NTA NaCa | 3.2 | 6.0 | 15.2 | " |
| | | 197 | EDTA Na₂Mg | 5.0 | 10.5 | 25.2 | " |
| | | 198 | EDTA Na₂Zn | 6.5 | 11.2 | 32.5 | " |
| | | 199 | NTA NaZn | 7.0 | 13.0 | 35.5 | " |
| | | 200 | DTPA Na₂Zn | 7.8 | 15.3 | 36.2 | " |
| | | 201 | TTHA Na₄Zn | 6.0 | 11.7 | 34.8 | " |
| | | 202 | EDTA Na₂Fe | 3.5 | 6.0 | 12.7 | " |
| | salt of EDTA and inorganic salt and organic salt dissolved | 203 | EDTANa₄/CaCl₂ molar ratio = 1:1 | 3.8 | 6.1 | 15.0 | " |
| | | 204 | EDTANa₄/CaCl₂ molar ratio = 1:1.5 | 4.2 | 7.5 | 23.5 | " |
| | | 205 | EDTANa₄/(CH2COO)₂Ca molar ratio = 1:2.5 | 6.0 | 10.5 | 31.2 | partially gelled |
| | | 206 | EDTANa₄/ZnCl₂ molar ratio = 1:1 | 6.5 | 14.2 | 32.0 | good: homogeneous and transparent |
| | | 207 | EDTANa₂Zn/MgCl₂ molar ratio = 1:0.25 | 6.2 | 13.0 | 30.4 | " |
| Comp. Ex. | inorganic salt | 22 | calcium carbonate | | 4.8 | 8.2 | gelled |
| | organic salt | 23 | calcium formate | 3.0 | 4.5 | 9.0 | gelled |
| | hydroxide | 24 | magnesium hydroxide | 3.0 | 3.8 | 8.5 | " |
| | EDTA K salt | 25 | EDTA K₄ | 2.8 | 3.0 | 4.7 | good: homogeneous and transparent |
| | | 26 | none | 2.4 | 2.7 | 4.5 | " |

TABLE 15

| | | | additive concn. (pts. wt. based on sand) | Various additives | Compressive strength (kg/cm²) room temp.: 25° C. humidity: 60% RH | | |
|---|---|---|---|---|---|---|---|
| | | | | | after 1 min | after 5 min | after 2 hr |
| Ex. | amino carboxylic acid | 208 | 0.12 | 10% aq. soln. of EDTANa₂Zn | 15.0 | 18.5 | 24.0 |
| | | 209 | 0.12 | 40% aq. soln. of EDTANa₂Zn | 18.0 | 22.0 | 29.5 |
| | | 210 | 0.24 | " | 20.2 | 26.2 | 35.5 |
| | | 211 | 0.12 | 40% aq. soln. of EDTANa₂Mg/NTANaZn molar ratio = 1:1 | 20.5 | 25.0 | 34.4 |
| | | 212 | 0.24 | 20% aq. soln. of NTA NaZn | 20.3 | 22.9 | 28.4 |
| | | 213 | 0.24 | 20% aq. soln. of CyDTANa₂Zn | 19.5 | 22.5 | 30.2 |
| | Na salt of EDTA and hydroxide or inorganic salt | 214 | 0.12 | 40% aq. soln. of EDTANa₂Mg(OH)₂ molar ratio = 1:1 | 16.0 | 19.7 | 25.8 |
| | | 215 | 0.20 | 40% aq. soln. of EDTANa₂Mg(OH)₂ molar ratio = 1:1 | 18.1 | 22.0 | 30.0 |
| | | 216 | 0.12 | 40% aq. soln. of EDTANa₄/CaCl₂ molar ratio = 1:1.5 | 19.0 | 25.0 | 33.3 |
| Comp. Ex. | | 27 | 0.12 | 40% aq. soln. of EDTA Ka/NaCl molar ratio = 1:1 | 8.5 | 9.0 | 9.8 |
| | | 28 | 0.12 | 40% aq. soln. of EDTANa₄/KCl molar ratio = 1:1 | 8.6 | 10.0 | 11.2 |
| | | 29 | | none | 8.0 | 8.4 | 9.2 |

TABLE 16

| | | | Compound dissolved in water-soluble phenolic resin | Compressive strength (kg/cm²) room temp.: 25° C., humidity: 60% RH | | | Storage stability (after 7 days, at 35° C.) |
|---|---|---|---|---|---|---|---|
| | | | | after 1 min | after 5 min | after 24 hr | |
| Ex. | amino carboxylic acid type | 217 | 0.4 wt. % EDTANa₂Zn | 14.5 | 17.8 | 23.0 | good: homogeneous and transparent |
| | | 218 | 1.6 wt. % EDTANa₂Zn | 17.2 | 20.3 | 26.0 | " |
| | | 219 | 4.0 wt. % EDTANa₂Zn | 19.0 | 24.8 | 31.5 | " |
| | | 220 | 1.6 wt. % EDTANa₂Mg/ | 18.0 | 22.0 | 30.0 | " |

TABLE 16-continued

|  |  | Compound dissolved in water-soluble phenolic resin | Compressive strength (kg/cm$^2$) room temp.: 25° C., humidity: 60% RH | | | Storage stability (after 7 days, at 35° C.) |
|---|---|---|---|---|---|---|
|  |  |  | after 1 min | after 5 min | after 24 hr |  |
|  | 221 | NATNaZn molar ratio = 1:1 1.6 wt. % | 18.7 | 22.5 | 27.5 | " |
|  | 222 | NATNaZn 1.6 wt. % CyDTANa$_2$Zn | 17.2 | 20.2 | 26.1 | " |
| Na salt of EDTA and hydroxide or in organic salt | 223 | 1.6 wt. % EDTANa$_4$/ Mg(OH)$_2$ molar ratio = 1:1 | 15.5 | 18.0 | 24.5 | " |
|  | 224 | 4.0 wt. % EDTANa$_4$/ Mg(OH)$_2$ molar ratio = 1:1 | 17.2 | 20.5 | 27.7 | " |
|  | 225 | 1.6 wt. % EDTANa$_4$/CaCl$_2$ molar ratio = 1:5 | 18.0 | 23.2 | 30.5 | " |
| Comp. Ex. | 30 | 1.6 wt. % EDTA K/NaCl molar ratio = 1.1 | 8.2 | 8.7 | 9.4 | " |
|  | 31 | 1.6 wt. % magnesium chloride | 9.5 | 10.5 | 12.5 | gelled |
|  | 32 | none | 8.0 | 8.4 | 9.2 | good: homogeneous and transparent |

We claim:

1. A process for producing a casting sand mold from reclaimed sand, which comprises:

a) blending (1) reclaimed sand, (2) a binder comprising a water-soluble alkaline phenolic resin, (3) a hardening agent comprising an organic ester compound, and (4) one or more additives comprising a group IB to VIII metal, in an amount of from 0.0001 to 10 parts by weight per 100 parts by weight of reclaimed sand to form a mixture, wherein said water-soluble alkaline phenolic resin of said binder (2) is curable with said organic ester compound of said hardening agent (3), and is obtained from alkaline or acidic reaction of a phenol compound, selected from the group consisting of phenol, cresol, resorcinol, 3, 5-xylenol, bisphenol A, and substituted phenols, with an aldehyde compound selected from the group consisting of formaldehyde, acetoaldehyde, furfural aldehyde, and mixtures thereof, and wherein the water-solubility of said resin has optionally been increased by the addition of an alkali selected from the group consisting of sodium hydroxide, potassium hydroxide, lithium hydroxide, and mixtures thereof;

b) molding said mixture; and c) curing said molded mixture to form said casting mold.

2. The process as claimed in claim 1, wherein said additive is a metal of the groups IB to VIII, or a compound including said metal.

3. The process as claimed in claim 1, wherein said additive is a metal of the groups II to VIII, or a compound including said metal.

4. The process as claimed in claim 1, wherein said additive is a metal of the groups II, III, IV or VIII, or a compound including said metal.

5. The process as claimed in claim 1, wherein said additive comprises compounds selected from the group consisting of (1) a metal-sequestering agent of said metal and (2) a chelating compound of said metal.

6. The process as claimed in claim 1, wherein said additive comprises compounds selected from the group consisting of:

(3) an inorganic salt of the metal, (4) an organic salt of the metal, (5) a hydroxide of the metal, (6) a complex compound of the metal and (7) an oxide of the metal.

7. The process as claimed in claim 1, which said metal of said additive is selected from the group consisting of magnesium and zinc.

8. The process as claimed in claim 2, wherein said additive comprises a metal selected from the group consisting of copper, silver, gold, magnesium, calcium, strontium, barium, zinc, cadmium, mercury, aluminum, scandium, gallium, titanium, zirconium, tin, vanadium, bismuth, chromium, molybdenum, tungsten, manganese, technetium, iron, cobalt, and nickel.

9. The process as claimed in claim 1, wherein said additive comprises an alloy of said metal.

10. The process of claim 9, wherein said alloy is selected from the group consisting of duralumin, magnalium, ferromagnesium, magnesiumsilicon, and ferromanganese.

11. The process as claimed in claim 6, wherein said additive comprises said inorganic salt, hydroxide, or oxide of said metal, having the formula $M_aX_b$, wherein M is said metal, a and b each are integers of 1 or larger, and X is oxygen, hydroxy, halogen, $SO_4$, $SO_3$, $S_2O_6$, $SiF_6$, $MoO_4$, $MnO_4$, $NO_3$, $NO_2$, $ClO_3$, $ClO$, $CO_3$, $HCO_3$, $CrO_4$, $IO_3$, $PO_3$, $PO_4$, $HPO_3$, $HPO_4$, $H_2PO_4$, $P_2O_7$, $H_2PO_2$, $SiO_3$, $BO_2$, $BO_3$, $B_4O_7$ or $Fe(CN)_6$.

12. The process as claimed in claim 11, wherein said additive comprises said inorganic salt of said metal.

13. The process as claimed in claim 6, wherein said additive comprises said organic salt of said metal, selected from the group consisting of formic acid, acetic acid, oxalic acid, tartaric acid, benzoic acid, sulfamic acid, xylenesulfonic acid, toluenesulfonic acid, phenolsulfonic acid, benzenesulfonic acid, alkylbenzenesulfonic acids, methylphosphoric acid and ethylphosphoric acid.

14. The process as claimed in claim 6, wherein said additive comprises said complex salt of said metal having the formula $M_2^{3+}(SO_4)_3 M_2^{1+} SO_4 24H_2O$ in which $M^{3+}$ is a trivalent metal selected from the group consisting of Al, V, Mn and Fe and $M^{1+}$ is Na or K.

15. The process as claimed in claim 6, wherein said additive comprises a compound selected from the group consisting of calcium chloride, magnesium chloride, barium chloride, copper chloride, zinc chloride, calcium bromide, aluminum fluoride, vanadium chloride, molybdenum chloride, manganese chloride, iron chloride, nickel chloride, calcium sulfide, calcium carbonate, magnesium phosphate, calcium phosphate, calcium formate, $MgC_2O_4 \cdot 2H_2O$, calcium toluenesulfonate, aluminum chloride, tin chloride, magnesium acetate, zinc acetate, aluminum sulfate, and aluminum acetate.

16. The process as claimed in claim 6, wherein said additive comprises a complex salt of said metal, selected from the group consisting of potassium and ammonium alums.

17. The process as claimed in claim 6, wherein said additive comprises a compound selected from the group consisting of aluminum hydroxide, calcium hydroxide, magnesium hydroxide, and zinc hydroxide.

18. The process as claimed in claim 6, wherein said additive comprises a compound selected from the group consisting of aluminum oxide, zinc oxide, calcium oxide, magnesium oxide, barium oxide, and mixtures thereof.

19. The process as claimed in claim 1, wherein said metal additive comprises a compound selected from the group consisting of Grignard reagents having formula R—Mg—X, wherein R is alkyl or aryl and X is halogen, trimethylaluminum, triethylaluminum, triphenylaluminum, $(C_2H_5)_2AlI$, $(C_2H_5)_2AlH$, $(C_2H_5)_2AlCN$, $Al(i-C_4H_9)_3$, $(CH_2=CH)_3Al$, $Zn(C_6H_5)_2$, $(CH_2=CH)_2Zn$ and $Ca(C_2H_5)_2$.

20. The process as claimed in claim 1, wherein said metal additive comprises a nitride selected from the group consisting of $Mg_3N_2$, $Zn_3N_2$ and AlN; a metal alkoxide selected from the group consisting of $Al(OCH(CH_3)_2)_3$ and $Zn(OCH_3)_2$; a hydride selected from the group consisting of $AlH_3$, $CaH_2$, and $BAH_3$; a compound selected from the group consisting of $Al_4C_3$ and $CaC_2$; a metal imide having the formula $Ca(NH_2)_2$; a peroxide selected from the group consisting of $CaO_2$, $BaO_2$, and $BaO_4$; a sulfide selected from the group consisting of ZnS, $Cu_2S$, and CuS; the compound AlP; the compound $CuNO_2$; the compound $Al(NHPh)_3$; a phenolate selected from the group consisting of Al-phenolate, Zn-phenolate and Ca-phenolate; a hexa-ammonium compound having the formula $Ca(NH_3)_6$; a ferrocene-type compound selected from the group consisting of $Fe(C_5H_5)_2$, $Zn(C_5H_5)_2$, $Ni(C_5H_5)_2$, $Mn(C_5H_5)_2$ and $V(C_5H_5)_2$; a hydrogenated inorganic metal polymer selected from the group consisting of a hydrogenated beryllium polymer, a hydrogenated magnesium polymer and a hydrogenated aluminum polymer; an aluminum nitride inorganic polymer; an aluminosilicate selected from the group consisting of zeolites, analcite, and mica; aluminum phosphate; or hydrotarcite.

21. The process as claimed in claim 1, wherein said metal additive comprises said metal and an inclusion compound selected from the group consisting of cyclic polyethers, cyclic polyamines, cyclic polythiaethers, complex donner crown compounds, heterocyclic crown compounds, cyclic phenols, and complexes with cyclodextrin derivatives.

22. The process as claimed in claim 1, wherein said metal additive comprises a complex compound selected from the group consisting of cements, furnace slags, $(Al(C_2O_4)_3)Cl_3$ and $(Zn(NH_3)_6)Cl_2$.

23. The process as claimed in claim 1, wherein said metal additive is selected from the group consisting of $Ni(CO)_4$, $Mn_2(CO)_{10}$, carboxypeptase A, and zircoaluminum.

24. The process as claimed in claim 5, wherein said metal-sequestering agent or said chelating compound contains ligands selected from the group consisting of ethylenediaminetetraacetic acid (EDTA) and its salts, nitrilotriacetic acid (NTA) and its salts, trans-1,2-cyclohexanediaminetetraacetic acid (CyDTA) and its salts, diethylenetriaminepentaacetic acid (DPTA) and its salts, triethylenetetraminehexaacetic acid (TTHA) and its salts, glycol ether diaminetetraacetic acid (GEDTA) and its salts, iminodiacetic acid (IDA) and its salts, polyalkylenediaminetetraacetic acid and its salts, N-hydroxyalkyleneiminodiacetic acid and its salts, 2-hydroxyphenyliminodiacetic acid and its salts, 2-hydroxybenzyliminodiacetic acid and its salts, benzyliminodiacetic acid and its salts, N,N'-ethylenebis[2-(o-hydroxyphenyl)]glycine and its salts, β-mercaptoethyliminodiacetic acid and its salts, ethyl ether diaminetetraacetic acid and its salts, ethyl thioether diaminetetraacetic acid and its salts, β-aminoethylsulfonic acid-N,N-diacetic acid and its salts, nitrilodiacetic acid-methylenephosphonic acid and its salts, N,N'diglycylethylenediamine-N',N'',N''', N''''-tetraacetic acid and its salts, gluconic acid and its salts, citric acid and its salts, tartaric acid and its salts, polyacrylic acid, a copolymer of acrylic acid with maleic acid, and their salts, tripolyphosphoric acid and its salts, hydroxyethanediphosphonic acid (HEDP) and its salts, and nitrilotristyrenephosphonic acid (NTP) and its salts.

25. The process as claimed in claim 5, wherein said metal-sequestering agent or said chelating compound comprises a coordination polymer selected from the group consisting of polymers containing an amino group, a nitrogen-containing heterocyclic group, a Schiff base group, a hydroxy group, a carboxy group, a carbonyl group, an ester group, an amide, an aminocarboxy group, a phosphonic acid group, a phosphine group and a thiol group.

26. The process as claimed in claim 1, wherein said metal is selected from the group consisting of magnesium, zinc, aluminum, calcium, and zirconium.

27. The process as claimed in claim 1, wherein said curing step c) is carried out during casting.

28. The process as claimed in claim 1, wherein said additive (4) is a salt or hydroxide containing a Group IB to VIII metal.

* * * * *